United States Patent Office 3,730,838
Patented May 1, 1973

3,730,838
ENZYMATIC PREPARATION OF L-CITRULLINE
Ichiro Chibata, Suita-shi, Toshio Kakimoto, Sakai-shi, Takeji Shibatani and Noriyuki Nishimura, Kobe-shi, Japan, assignors to Tanabe Seiyaku Co., Ltd., Osaka, Japan
No Drawing. Filed Mar. 2, 1971, Ser. No. 120,368
Claims priority, application Japan, Mar. 14, 1970, 45/21,861
Int. Cl. C12d 13/06
U.S. Cl. 195—29                    10 Claims

ABSTRACT OF THE DISCLOSURE

An L-arginine deiminase-producing microorganism selected from the group consisting of Pseudomonas fluorescens, Pseudomonas ovalis, Pseudomonas pavonacea, Pseudomonas putida, Leuconostoc citrovorum, Leuconostoc mesenteroides, Sarcina lutea, Streptomyces griseus, Mycobacterium smegmatis and Mycobacterium avium is cultivated in an aqueous nutrient medium and under aerobic conditions. The cultivation is preferably carried out at about 30–37° C. A fermentation broth is produced. The broth is incubated with L- or DL-arginine. Alternatively a refined aqueous preparation produced from the broth may be employed. The incubation is preferably carried out at 25–40° C. and at pH 4.5–7.0. L-citrulline is recovered from the resultant reaction mixture.

---

This invention relates to the enzymatic preparation of L-citrulline.

It is known that some microorganisms such as Streptococcus faecalis, Clostridium perfringens, Micrococcus pyogenes, Bacillus pyocyaneus and Baker's yeast may produce L-arginine deiminase. It is also known that the enzymatic preparation of L-citrulline from L-arginine is conducted by employing the L-arginine deiminase which accumulates in the cells. (Biochem. Preparations, 3, 104 (1953); J. Biol. Chem., 198, 771 (1952); Can. J. Microbiol., 1, 339 (1955); Z. physiol. Chem., 216, 244 (1930); Biochim. Biophys. Acta, 9, 687 (1952)). However, these methods are not satisfactory for industrial use, because the activity of L-arginine deiminase is relatively low. For instance, when an aqueous solution of L-arginine was treated with the fermentation broth of Streptococcus faecalis, an organism known to produce the most potent L-arginine deiminase activity of the above-mentioned microorganisms, a low conversion ratio of 6.3 mg./ml. per hour was obtained. Moreover, since these microorganisms produce ornithine transcarbamylase in the cells at the same time, they cannot be used to prepare L-citrulline unless the transcarbamylase is first inactivated by treating the microbial cells with cetyltrimethyl ammonium bromide or acetone to prevent the L-citrulline thus prepared from being further converted to L-ornithine.

This invention provides a novel and simple process for the enzymatic preparation of L-citrulline by using a microorganism which accumulates in its cells highly active L-arginine deiminase. This microorganism should not produce other interfering enzymes such as, for example, L-ornithine transcarbamylase.

According to this invention, L-citrulline is produced in high yield by cultivating an L-arginine deiminase-producing microorganism belonging to the Pseudomonas, Leuconostoc, Sarcina, Streptomyces or Mycobacterium genera in an aqueous nutrient medium under aerobic conditions, incubating L- or DL-arginine with the resultant fermentation broth, and recovering L-citrulline from the reaction mixture.

Typical examples of microorganisms which may be employed in the present method include Pseudomonas fluorescens IFO (Institute for Fermentation, Osaka, Japan) No. 3081, Pseudomonas ovalis IAM (Institute of Applied Microbiology, Tokyo University, Japan) No. 1002, Pseudomonas pavonacea IAM No. 1155, Pseudomonas putida ATCC (American Type Culture Collection, Washington, U.S.A.) No. 4359, Leuconostoc citrovorum ATCC No. 8081, Leuconostoc mesenteroides ATCC No. 8042, Sarcina lutea ATCC No. 9341, Streptomyces griseus IFO No. 3122, Micobacterium smegmatis ATCC No. 607 and Mycobacterium avium IFO No. 3154.

The fermentation of each of the above-mentioned microorganisms may be performed by either shaking cultivation or submerged fermentation under aerobic conditions. It is preferred to carry out the fermentation at 30° to 37° C. The nutrient medium is comprised of a source of carbon, a source of nitrogen and other trace elements. Suitable sources of carbon for the fermentation include glucose, fructose, sorbose, sucrose, saccharified starch solution, sugar alcohol and salts of organic acids (e.g., sodium fumarate, sodium succinate, sodium citrate, sodium tartrate, sodium malate, sodium maleate). Examples of suitable sources of nitrogen are yeast extract, meat extract, peptone, casein hydrolysate, ammonium salts of organic or inorganic acids (e.g., ammonium acetate, ammonium oxalate, dibasic ammonium phosphate, ammonium chloride, ammonium sulfate), ammonia and urea. The preferred amount of said source of carbon and said source of nitrogen in the medium are respectively within the range of 0.5 to 3 w./v. percent and 0.05 to 1.0 w./v. percent, respectively. Moreover, it is desired to control the amount such that the ratio of carbon:nitrogen in the medium is 1:10. Besides these nutrients, 0.0001 to 0.1 w./v. percent of an inorganic element such as, for example, potassium phosphate, magnesium sulfate, manganese sulfate, ferrous sulfate or sodium chloride may be added to the medium.

The formation of L-arginine deiminase in the fermentation broth may be even further enhanced by the addition of about 0.1 to 1 w./v. percent of L-arginine to the medium. L-arginine may be employed either as the free form or salt such as hydrochloride. The fermentation of the instant invention can be accomplished in about 16 to 24 hours.

After the fermentation, L-arginine is added to the fermentation broth and the mixture is incubated for a sufficient period of time to convert L-arginine into L-citrulline. Alternatively, DL-arginine may be employed as a substrate in the procedure in place of L-arginine. In this procedure, L-arginine is especially converted into L-citrulline while D-arginine remains unchanged in the reaction solution. The enzymatic reaction may be substantially completed by incubating at pH 4.5 to 7.0, particularly at pH 6.0, for one to fifty hours. The optimum temperature for the enzymatic reaction is about 37° C. An amount of over 50 w./v. percent of L-arginine or DL-arginine can be added to the fermentation broth. In the above-reaction procedures, the fermentation broth may be replaced by an aqueous suspension of living cells collected from the broth or by dried cells. A cell-free extract containing L-arginine deiminase which is prepared by a conventional procedure, such as ultrasonic extraction, can also be employed for this purpose.

Moreover, when an amount of about 0.005 to 2 w./v. percent of a surface active agent such as, for example, a cetyltrimethylammonium bromide, triethanolamine laurylsulfate or sodium laurylsulfate is added to the reaction mixture, the enzymatic reaction time can be shortened to approximately one-third because the permeability of the cell membrane of the microorganism employed is increased.

After enzymatic reaction of the invention is completed, microbial cells or other solid culture compositions are removed from the fermentation broth by a conventional procedure such as filtration or centrifugation. Known procedures may be employed in the recovery and/or purification of L-citrulline from the filtrate or the supernatant solution containing L-citrulline or a mixture of L-citrulline and D-arginine. Direct crystallization, ion exchange resin-adsorption procedure or a combination of these procedures may be advantageously employed for this purpose. Thus, an amount of over 210 mg. of pure L-citrulline is obtained from one ml. of the reaction mixture.

Practical and presently preferred embodiments of this invention are illustratively shown in the following examples. All perecntage of the fermentation medium are by weight/volume.

EXAMPLE 1

An aqueous nutrient medium comprising the following ingredients is prepared:

| | |
|---|---|
| Glucose | 2.0 |
| Yeast extract | 0.5 |
| Polypeptone | 0.5 |
| Dibasic ammonium phosphate | 0.5 |
| Dibasic potassium phosphate | 0.1 |
| Magnesium sulfate hepta hydrate | 0.05 |
| Manganous sulfate tetra hydrate | 0.01 |
| Ferrous sulfate hepta hydrate | 0.0002 |
| Sodium chloride | 0.005 |

The above medium is adjusted to a pH of 6.2. 250 ml. of the medium is charged into a 500 ml. shakable flask and the flask and its contents are sterilized. *Psudomonas putida* ATCC No. 4359 is cultivated for 24 hours in a medium comprising the same ingredients stated above. 0.25 ml. of inoculum thus produced is inrtoduced into the above sterilized medium. The cultivation is carried out for 24 hours at 30° C. with shaking at the rate of 140 rotations/minute. Acetic acid is added to the medium to bring its pH to 6.0. 125 g. of L-arginine hydrochloride are added to the medium. The mixture is allowed to stand for 72 hours at 37° C. After the reaction, the microbial cells are removed by centrifugation. The supernatant solution thus obtained is passed through a column of 500 ml. of strong cation exchange resin (H-form). (Manufactured by Rohm & Haas Company under the trade name "Amberlite IR-120.") The column is washed with water and then eluted with 1000 ml. of 5% aqueous ammonia. The eluate is concentrated to dryness. The resultant residue is recrystallized from ethanol. 89.3 g. of L-citrulline are obtained. M.P. 222° C. $[\alpha]_D^{25}$ +21.2° (c.=10, 1 N HCl).

EXAMPLE 2

250 ml. of a nutrient medium comprising the same ingredients as described in Example 1 is prepared. *Pseudomonas fluorescen* IFO No. 3081 is cultivated by the procedure of Example 1. 0.25 ml. of inoculum thus produced is introduced into the medium. The cultivation is carried out for 24 hours at 30° C. with shaking at the rate of 140 rotations/minute. Acetic acid is added to the medium to bring its pH to 6.0. 125 g. of L-arginine hydrochloride and 0.5 ml. of 50% thiethanolamine laurylsulfate are added to the medium. The mixture is allowed to stand for 48 hours at 37° C. After the reaction, the microbial cells are removed by centrifugation. The supernatant solution thus obtained is treated in the same manner as described in Example 1. 93 g. of L-citrulline are obtained. M.P. 222° C. $[\alpha]_D^{25}$ +21.0° (c.=10, 1 N HCl).

EXAMPLE 3

250 ml. of a nutrient medium comprising the same ingredients described in Example 1 (except that 2.0 w./v. percent of a saccharified starch solution is employed instead of glucose) is prepared. *Pseudomonas ovalis* IAM No. 1002 is cultivated by the procedure of Example 1. 0.25 ml. of inoculum thus produced is introduced into the medium. The cultivation is carried out for 24 hours at 30° C. with shaking at the rate of 140 rotations/minute. Acetic acid is added to the medium to bring its pH to 6.0. 125 g. of L-arginine hydrochloride and 50 mg. of cetyltrimethylammonium bromide are added to the medium. The medium is allowed to stand for 48 hours at 37° C. After the reaction is completed, the microbial cells are removed by centrifugation. The supernatant solution thus obtained is treated in the same manner as described in Example 1. 83.1 g. of L-citrulline are obtained. M.P. 222° C. $[\alpha]_D^{25}$ +20.9° (c.=10, 1 N HCl).

EXAMPLE 4

An aqueous nutrient medium comprising the following ingredients is prepared:

| | |
|---|---|
| Glucose | 2.0 |
| Yeast extract | 0.5 |
| Polypeptone | 0.5 |
| Dibasic ammonium phosphate | 0.5 |
| Dibasic potassium phosphate | 0.1 |
| Magnesium sulfate heptahydrate | 0.05 |
| Manganous sulfate tetrahydrate | 0.01 |
| Ferrous sulfate heptahydrate | 0.0002 |
| Sodium chloride | 0.005 |
| L-arginine hydrochloride | 0.5 |

The above medium is adjusted to pH 6.2. 250 ml. of the medium is charged into a 500 ml. shakable flask and the flask and its contents are sterilized. *Pseudomonas pavonacea* IAM No. 1155 is cultivated for 24 hours in a medium comprising the same ingredients as stated above. 0.25 ml. of inoculum thus produced is introduced into the sterilized medium. The cultivation is carried out for 20 hours at 30° C. with shaking at the rate of 140 rotations/minute. The microbial cells are separated from the medium by centrifugation and then suspended in 250 ml. of a 1 M sodium acetate buffer solution (pH 6.0) containing 125 g. of L-arginine hydrochloride. The suspension is allowed to stand for 60 hours at 37° C. After the reaction is completed, the microbial cells are removed by centrifugation. The supernatant solution thus obtained is treated in the same manner as described in Example 1. 91.5 g. of L-citrulline are obtained. M.P. 222° C. $[\alpha]_D^{25}$+21.3° (c.=10, 1 N HCl).

EXAMPLE 5

An aqueous nutrient medium comprising the following ingredients is prepared:

| | |
|---|---|
| Glucose | 1.0 |
| Yeast extract | 0.5 |
| Polypeptone | 1.0 |
| Dibasic potassium phosphate | 0.1 |
| Ammonium chloride | 0.5 |
| Magnesium sulfate heptahydrate | 0.01 |
| Ferrous sulfate heptahydrate | 0.001 |

The above medium is adjusted to pH 6.2. 300 ml. of the medium is charged into a 500 ml. shakable flask and the flask and its contents are sterilized. *Leuconostoc citrovorum* ATCC No. 8081 is cultivated for 24 hours in a medium comprising the same ingredients as stated above. 0.3 ml. of inoculum thus produced is introduced into the sterilized medium. The cultivation is carried out by permitting the medium to stand for 30 hours at 30° C. Sodium hydroxide is added to the medium to bring its pH to 6.0. 150 g. of L-arginine hydrochloride are added to the medium. The medium is allowed to stand for 60 hours at 37° C. After the reaction is completed, the microbial cells are removed by centrifugation. The supernatant solution thus obtained is treated in the same manner as described in Example 1. 105.8 g. of L-citrulline are obtained. M.P. 222° C. $[\alpha]_D^{25}$+21.5° (c.=10, 1 N HCl).

EXAMPLE 6

An aqueous nutrient medium comprising the following ingredients is prepared:

| | |
|---|---|
| Glucose | 1.0 |
| Yeast extract | 0.5 |
| Casein hydrolysate | 1.0 |
| Dibasic potassium phosphate | 0.1 |
| Ammonium chloride | 0.5 |
| Magnesium sulfate heptahydrate | 0.01 |
| Ferrous sulfate heptahydrate | 0.001 |
| L-arginine hydrochloride | 0.1 |

The above medium is adjusted to pH 6.2. 300 ml. of the medium is charged into a 500 ml. shakable flask and the flask and its contents are sterilized. *Leuconostoc mesenteroides* ATCC No. 8042 is cultivated for 24 hours in a medium comprising the same ingredients as stated above. 0.3 ml. of inoculum thus produced is introduced into the sterilized medium. The cultivation is carreid out for 24 hours at 30° C. with shaking at the rate of 140 rotation/minute. Acetic acid is added to the medium to bring its pH to 6.0. 125 g. of L-arginine hydrochloride and 0.5 ml. of 50% triethanolamine laurylsulfate are added to the medium. The medium is allowed to stand for 48 hours at 37° C. After the reaction is completed, the microbial cells are separated by centrifugation. The supernatant solution thus obtained is treated in the same manner as described in Example 1. 93.6 g. of L-citrulline are obtained. M.P. 222° C. $[\alpha]_D^{25}+21.0°$ (c.=10, 1 N HCl).

The microbial cells recovered from the above mixture are suspended in 300 ml. of the 1 M-sodium acetate buffer solution (pH 6.0) containing 100 g. of L-arginine hydrochloride. The resultant suspension is allowed to stand for 80 hours at 37° C. After the reaction is completed, the microbial cells are removed by centrifugation. The supernatant solution thus obtained is treated in the same manner described in Example 1. 64.6 g. of L-citrulline are obtained. M.P. 222° C. $[\alpha]_D^{25}19.8°$ (c.=10, 1 HCl).

EXAMPLE 7

250 ml. of a nutrient medium comprising the same ingredients as described in Example 4 is prepared. *Sarcina lutea* ATCC No. 9341 is cultivated by the procedure of Example 4. 0.25 ml. of inoculum thus produced is introduced into the medium. The cultivation is carried out for 20 hours at 30° C. with shaking at the rate of 140 rotations/minute. Acetic acid is added to the medium to bring its pH to 6.0. 125 g. of DL-arginine hydrochloride and 0.2 g. of sodium laurylsulfate are added to the medium. The medium is allowed to stand for 80 hours at 37° C. After the reaction is completed, the microbial cells are removed by centrifugation. The supernatant solution is passed through a column of 500 ml. of a strong cation exchange resin (H-forms). (Manufactured by Rohm & Haas Company under the trade name "Amberlite IR-120".) The column is washed with water and then eluted with 1000 ml. of 5% aqueous ammonia. The eluate is concentrated, under reduced pressure, to about 200 ml. Then, the concentrated solution is passed through a column of 250 ml. of a weak cation exchange resin (H-form). (Manufactured by Rohm & Haas Company under the trade name "Amberlite IRC-50".) The effluent is concentrated to dryness and the residue thus obtained is recrystallized from ethanol. 45.7 g. of L-citrulline are obtained. M.P. 222° C. $[\alpha]_D^{25}+21.0°$ (c.=10, 1 N HCl).

The column of weak cation exchange resin is washed with water and then eluted with 500 ml. of 2 N hydrochloric acid. The eluate is concentrated, under reduced pressure, to dryness. The residue is dissolved in 150 ml. of water. A weak anion exchange resin (OH-form) (manufactured by Rohm & Haas Company under the trade name "Amberlite IR-45") is added to the aqueous solution. The pH of the mixture is then adjusted to 6.0. The resin is removed by filtration, and the filtrate is concentrated, under reduced pressure, to dryness. The residue thus obtained is recrystallized from ethanol. 52.6 g. of D-arginine hydrochloride are obtained. M.P. 215° C. $[\alpha]_D^{25}-22.7°$ (c.=2, 5 N HCl).

EXAMPLE 8

An aqueous nutrient medium comprising the following ingredients is prepared:

| | |
|---|---|
| Meat extract | 1.0 |
| Glucose | 1.0 |
| Polypeptone | 1.0 |
| Ammonium chloride | 0.1 |
| Dibasic potassium phosphate | 0.1 |
| Magnesium sulfate heptahydrate | 0.02 |
| Manganous sulfate tetrahydrate | 0.01 |
| Ferrous sulfate heptahydrate | 0.0002 |
| L-arginine hydrochloride | 1.0 |

The above medium is adjusted to pH 6.2. 200 ml. of the medium is charged into a 500 ml. shakable flask and the flask and its contents are sterilized. *Streptomyces griseus* IFO No. 3122 is cultivated for 24 hours in a medium comprising the same ingredients as stated above. 0.2 ml. of inoculum thus produced is introduced into the sterilized medium. The cultivation is carried out for 24 hours at 30° C. with shaking at the rate of 140 rotations/minute. Acetic acid is added to the medium to bring its pH to 6.0. 125 g. of L-arginine hydrochloride and 0.5 ml. of 50% triethanolamine laurylsulfate are added to the medium. The mixture is allowed to stand for 48 hours at 37° C. After the reaction is completed, the microbial cells are removed by centrifugation. The supernatant solution thus obtained is treated in the same manner as described in Example 1. 90.6 g. of L-citrulline are obtained. M.P. 222° C. $[\alpha]_D^{25}+21.0°$ (c.=10, 1 N HCl).

EXAMPLE 9

300 ml. of a nutrient medium comprising the same ingredients as described in Example 8 is prepared. *Mycobacterium avium* IFO No. 3154 is cultivated by the procedure of Example 8. 0.3 ml. of inoculum thus produced is introduced into the medium. The cultivation is carried out by permitting the medium to stand for 48 hours at 30° C. The microbial cells are separated from the medium by centrifugation and then suspended in 300 ml. of a 1 M sodium acetate buffer solution (pH 6.0) containing 60 g. of DL-arginine hydrochloride. The suspension is allowed to stand for 48 hours at 37° C. After the reaction is completed, the microbial cells are removed by centrifugation. The supernatant solution thus obtained is treated in the same manner as described in Example 7. 21.5 g. of L-citrulline and 25.3 g. of D-arginine hydrochloride are obtained.

L-citrulline: M.P. 222° C. $[\alpha]_D^{25}+21.2°$ (c.=10, 1 N HCl).

D-arginine hydrochloride: M.P. 215° C. $[\alpha]_D^{25}-22.5°$ (c.=2, 5 N HCl).

EXAMPLE 10

200 ml. of a nutrient medium comprising the same ingredients as described in Example 8 is prepared. *Mycobacterium smegmatis* ATCC No. 607 is cultivated by the procedure of Example 8. 0.2 ml. of inoculum thus produced is introduced into the medium. The cultivation is carried out for 24 hours at 30° C. with shaking at the rate of 140 rotations/minute. Acetic acid is added to the medium to bring its pH to 6.0. 125 g. of L-arginine hydrochloride and 0.5 ml. of 50% triethanolamine laurylsulfate are added to the medium. The mitxure is allowed to stand at 37° for 48 hours. After the reaction is completed, the microbial cells are removed by centrifugation. The supernatant solution thus obtained is treated in the same manner as described in Example 1. 88.7 g. of L-citrulline are obtained. M.P. 222° C. $[\alpha]_D^{25}+21.3°$ (c.=10, 1 N HCl).

What is claimed is:

1. A process for preparing L-citrulline which comprises cultivating an L-arginine deiminase-producing microorganism selected from the group consisting of *Pseudomonas fluoroescens, Pseudomonas ovalis, Pseudomonas pavonacea, Pseudomonas putida, Leuconostoc citrovorum, Leuconostoc mesenteriodes, Sarcina lutea, Streptomyces griseus, Mycobacterium smegmatis* and *Mycobacterium avium* in an aqueous nutrient medium under areobic conditions to produce a fermentation broth, incubating L- or DL-arginine with said fermentation broth or with an aqueous suspension of living or dried living microorganism cells collected from said fermentation broth, or with a cell-free extract containing L-arginine deiminase prepared from the living cells of said microorganism to produce a reaction mixture and recovering L-citrulline from the reaction mixture.

2. The process according to claim 1 wherein the incubation of L- or DL-arginine is carried out at about 25° to 40° C. and at a pH of about 4.5 to 7.0.

3. The process according to claim 1 wherein the microorganism is selected from the group consisting of *Pseudomonas fluorescens* IFO No. 3081, *Pseudomonas ovalis* IAM No. 1002, *Pseudomonas pavonacea* IAM No. 1155, *Pseudomonas putida* ATCC No. 4359, *Leuconostoc citrovorum* ATCC No. 8081, *Leuconostoc mesenteroides* ATCC No. 8042, *Sarcina lutea* ATCC No. 9341, *Streptomyces griseus* IFO No. 3122, *Mycobacterium smegmatis* ATCC No. 607 and *Mycobacterium avium* IFO No. 3154.

4. The process according to claim 1 wherein the cultivation is carried out at about 30° to 37° C., and said medium contains 0.5 to 3 w./v. percent of a carbon source, 0.05 to 0.1 w./v. percent of a nitrogen source and 0.0001 to 0.1 w./v. percent of an inorganic element.

5. The process according to claim 4 wherein the medium also contains about 0.1 to 1 w./v. percent of L-arginine.

6. The process according to claim 2 wherein the incubation is carried out at 37° C.

7. A process for preparing L-citrulline which comprises cultivating an L-arginine deiminase-producing microorganism selected from the group consisting of *Pseudomonas fluorescens, Pseudomonas ovalis, Pseudomonas pavonacea, Pseudomonas putida, Leuconostoc citrovorum, Leuconostoc mesenteriodes, Sarcina lutea, Streptomyces griseus, Mycobacterium smegmatis* and *Mycobacterium avium* in an aqueous nutrient medium containing 0.5 to 3 w./v. percent of a carbon source, 0.05 to 1.0 w./v. percent of a nitrogen source and 0.0001 to 0.1 w./v. percent of an inorganic element at about 30° to 37° C. under aerobic conditions to produce a fermentation broth, incubating L- or DL-arginine with said fermentation broth, or with an aqueous suspension of living or dried living microorganism cells collected from said fermentation broth, or with a cell-free extract containing L-arginine deiminase prepared from the living cells of said microorganism at about 25° to 40° C. and at a pH of about 4.5 to 7.0 to produce a reaction mixture, and recovering L-citrulline from the reaction mixture.

8. The process according to claim 7 wherein the incubation is carried out at 37° C.

9. A process for preparing L-citrulline which comprises cultivating an L-arginine deiminase-producing microorganism selected from the group consisting of *Pseudomonas fluorescens, Pseudomonas ovalis, Pseudomonas pavonacea, Pseudomonas putida, Leuconostoc citrovorum, Leuconostoc mesenteroides, Sarcina lutea, Streptomyces griseus, Mycobacterium smegmatis* and *Mycobacterium avium* in an aqueous nutrient medium containing 0.5 to 3 w./v. percent of a carbon source, 0.05 to 1.0 w./v. percent of a nitrogen source, 0.0001 to 0.1 w./v. percent of an inorganic element and 0.1 to 1 w./v. percent of L-arginine at about 30° to 37° C. under aerobic conditions to produce a fermentation broth, incubating L- or DL-arginine with said fermentation broth or with an aqueous suspension of living or dried living microorganims cells collected from said fermentation broth, or with a cell-free extract containing L-arginine deiminase prepared from the living cells of said microorganism at 25° to 40° C., and at a pH of 4.5 to 7.0, to produce a reaction mixture, and recovering L-citrulline from the reaction mixture.

10. The process according to claim 9 wherein the incubation is carried out at 37° C.

References Cited

UNITED STATES PATENTS 3,282,794   11/1966   Okumura et al. _____ 195—29

ALVIN E. TANENHOLTZ, Primary Examiner